(12) United States Patent
Tseng

(10) Patent No.: US 7,163,323 B1
(45) Date of Patent: Jan. 16, 2007

(54) VEHICULAR ROTATABLE LAMP UNIT

(76) Inventor: Chian-Yin Tseng, No. 60, Lane 105, Wen-Nan Road, Tainan City (TW)

( * ) Notice: Subject to any disclaimer, the term of this patent is extended or adjusted under 35 U.S.C. 154(b) by 0 days.

(21) Appl. No.: 11/270,522

(22) Filed: Nov. 10, 2005

(51) Int. Cl.
*F21V 21/14* (2006.01)

(52) U.S. Cl. .................. 362/523; 362/35; 362/507; 362/526; 362/536

(58) Field of Classification Search ............... 362/509, 362/526, 534, 536, 507, 35, 523
See application file for complete search history.

(56) References Cited

U.S. PATENT DOCUMENTS 6,543,924 B1 * 4/2003 Sugimoto et al. ........... 362/523

2004/0037064 A1 * 2/2004 Johnson ..................... 362/35
2004/0057240 A1 * 3/2004 Baba et al. ................. 362/467

* cited by examiner

*Primary Examiner*—Stephen F Husar
*Assistant Examiner*—Meghan K. Dunwiddie
(74) *Attorney, Agent, or Firm*—Greenblum & Bernstein, P.L.C.

(57) ABSTRACT

A vehicular rotatable lamp unit includes a main seat adapted to be mounted on a vehicle, a lamp seat assembly connected pivotally to the main seat, a conducting wire, a first contact assembly mounted on the main seat, and a second contact assembly adapted to be connected to a power source of the vehicle. The conducting wire has a first end connected electrically to the lamp seat assembly, and a second end opposite to the first end. The first contact assembly includes a first contact member connected electrically to the second end of the conducting wire and rotatable along with the lamp seat assembly. The second contact assembly includes a second contact member to contact the first contact member.

5 Claims, 3 Drawing Sheets

VEHICULAR ROTATABLE LAMP UNIT

BACKGROUND OF THE INVENTION

1. Field of the Invention

The invention relates to a lamp unit, more particularly to a vehicular rotatable lamp unit.

2. Description of the Related Art

Generally, vehicles, such as automobiles, boats, etc., are designed with a conventional lamp unit fixed in front of a driver's seat. However, since the lamp unit remains fixed in its location, when the vehicle is driven along a curve in the road or around a corner, the driver is not able to clearly see objects on the left and right sides of the road. This poses significant safety risks during nighttime driving.

Currently, a rotatable lamp unit that is capable of rotating in accordance with a steering wheel of the vehicle is available. The rotatable lamp unit reduces the possibility of an accident especially when driving along a winding road.

Although the aforementioned rotatable lamp unit can enhance vehicle safety, in actual use, electrical wires connecting a power source of the vehicle to a lamp seat of the lamp unit are frequently entangled during driving so that breaks in the electrical wires easily occur.

SUMMARY OF THE INVENTION

Therefore, the object of the present invention is to provide a vehicular rotatable lamp unit that is capable of overcoming the aforementioned drawbacks of the prior art.

According to this invention, a vehicular rotatable lamp unit comprises a main seat adapted to be mounted on a vehicle, a lamp seat assembly connected pivotally to the main seat, a conducting wire, a first contact assembly mounted on the main seat, and a second contact assembly adapted to be connected to a power source of the vehicle. The conducting wire has a first end connected electrically to the lamp seat assembly, and a second end opposite to the first end. The first contact assembly includes a first contact member connected electrically to the second end of the conducting wire and rotatable along with the lamp seat assembly. The second contact assembly includes a second contact member to contact the first contact member.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
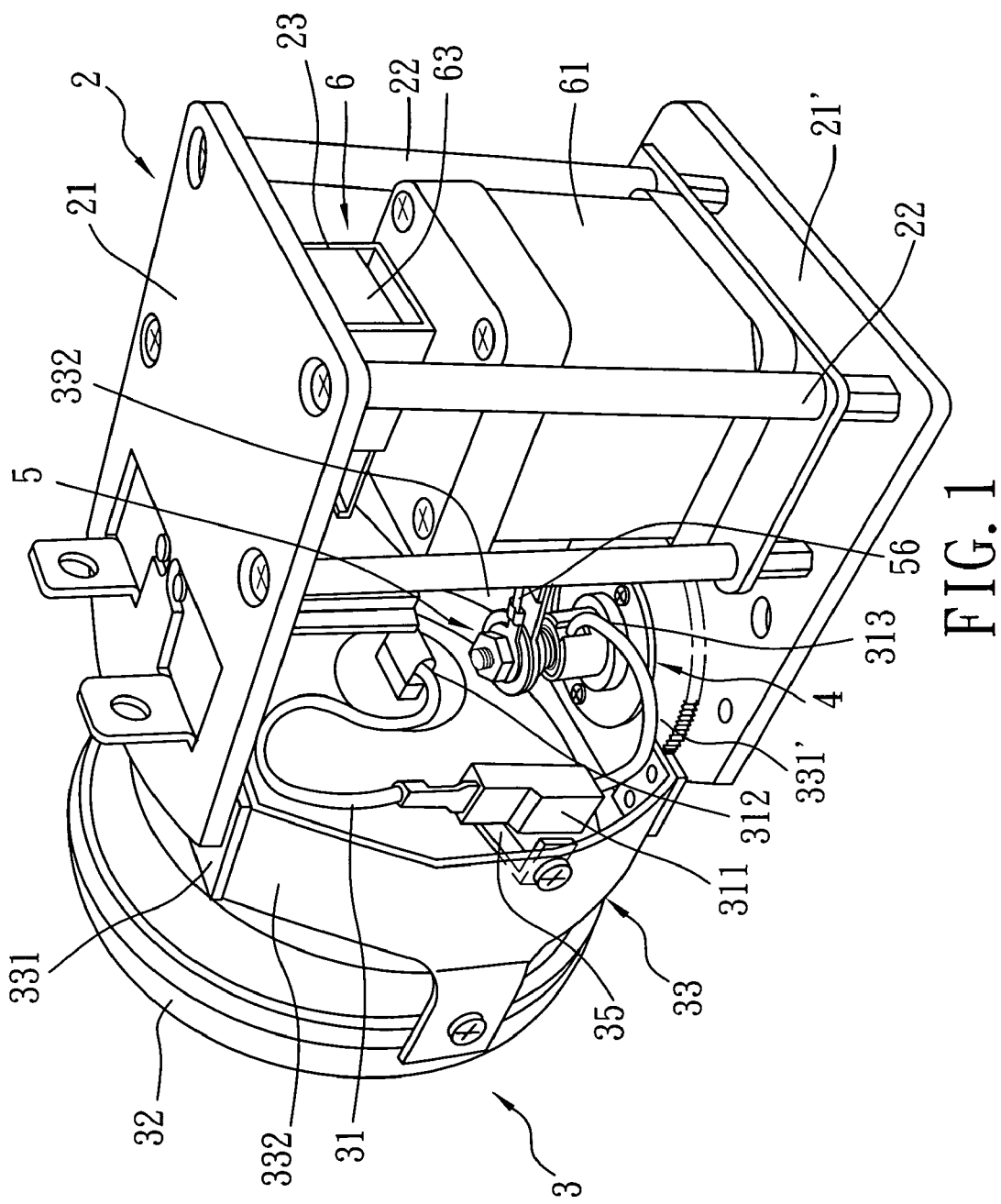
FIG. 1 is a perspective view of the preferred embodiment of a rotatable lamp unit according to the present invention.
Figure 2:
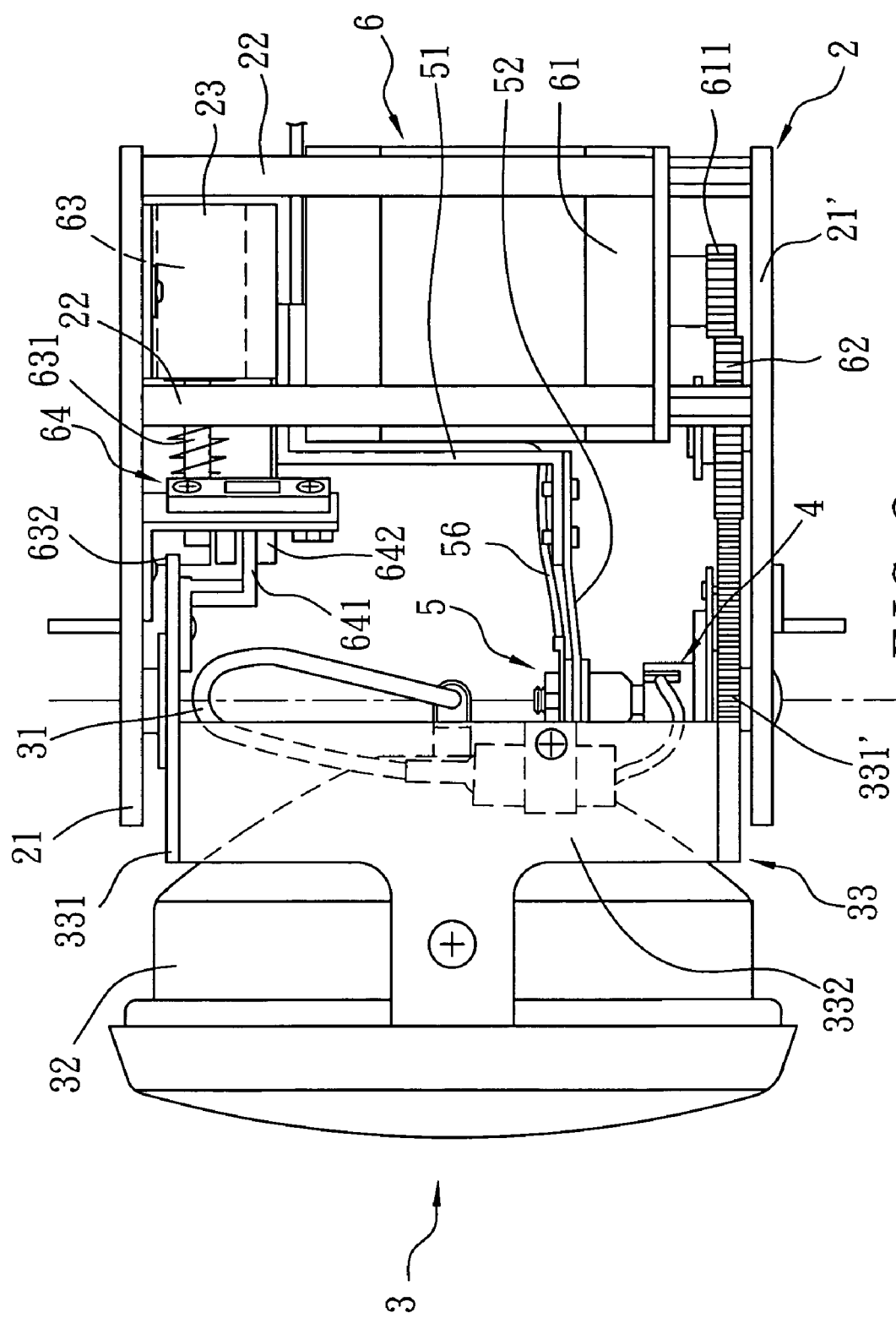
FIG. 2 is a schematic side view of the preferred embodiment.
Figure 3:
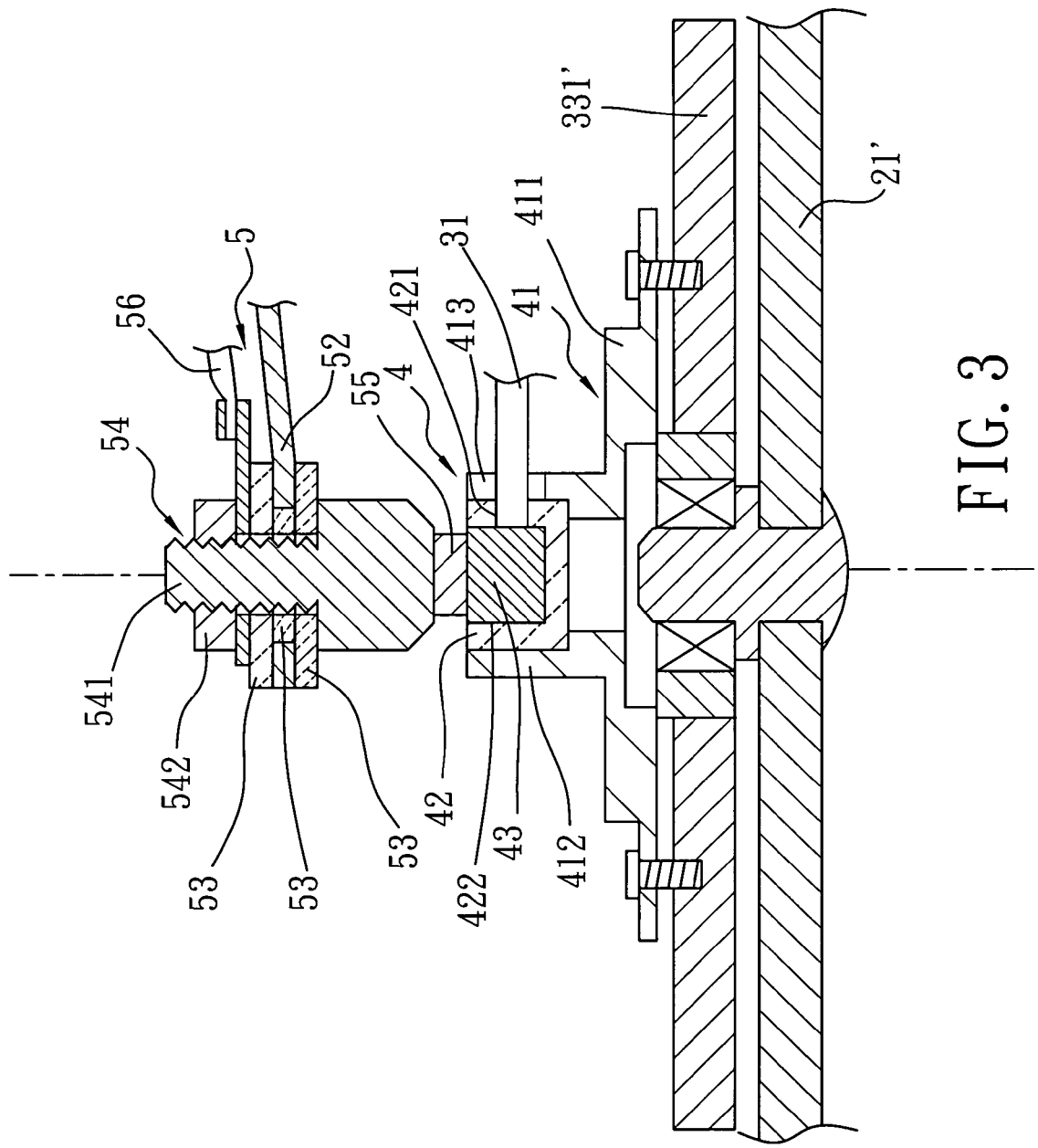
FIG. 3 is an enlarged sectional view of first and second contact assemblies of the preferred embodiment.

Referring to FIGS. 1 to 3, the preferred embodiment of a rotatable lamp unit according to the present invention is adapted to be installed on a vehicle (not shown), and is shown to comprise a main seat 2, a lamp seat assembly 3, a conducting wire 31, a first contact assembly 4, a second contact assembly 5, and a driving unit 6.

The main seat 2 is adapted to be mounted fixedly on the vehicle, and includes metal top and bottom plates 21, 21', a plurality of spaced-apart parallel connecting rods 22 fixed between rear end portions of the top and bottom plates 21, 21', and a substantially U-shaped fixed plate 23 connected to a bottom face of the top plate 21.

The lamp seat assembly 3 is connected pivotally to the main seat 2, and includes a lamp seat 32 adapted to accommodate a light emitting member (not shown), and a lamp seat holder 33 connected to the lamp seat 32.

The lamp seat holder 33 includes top and bottom horizontal plates 331, 331' and two metal curved plates 332 interconnecting the top and bottom horizontal plates 331, 331'. The top and bottom horizontal plates 331, 331' are connected pivotally and respectively to the top and bottom plates 21, 21' of the main seat 2. The bottom horizontal plate 331' is made of plastic, and has a rear half-part provided with a gear. The top horizontal plate 331 is made of metal.

The lamp seat 32 is fixed between front ends of the curved plates 332, and is movable along with the lamp seat holder 33. Alternatively, the lamp seat 32 may be directly and pivotally connected to the main seat 2, in which case the lamp seat 32 itself performs the function of the lamp seat holder 33.

The conducting wire 31 has a first end 312 connected electrically to the lamp seat 32, and a second end 313 opposite to the first end 312. In this embodiment, the conducting wire 31 has an intermediate portion 311 interconnecting the first and second ends 312, 313 of the conducting wire 31 and that is fixed to one of the curved plates 332 of the lamp seat holder 33 through a substantially U-shaped positioning bracket 35.

It should be noted that the lamp seat 32 forms a ground connection by virtue of its metal outer casing, and through its connection to the curved plates 332 and the top horizontal plate 331 of the lamp seat holder 33, which are, in turn, connected to the top and bottom plates 21, 21' of the main seat 2. The top and bottom plates 21, 21' are connected with the vehicle to thereby complete the connection to ground.

The first contact assembly 4 is mounted on the main seat 2, and includes a first contact holder 41, a hollow insulation seat 42, and a first contact member 43. The first contact holder 41 has a top cavity 412, a first through hole 413 in spatial communication with the top cavity 412, and a ring-shaped bottom flange 411 screwed to a top face of the bottom horizontal plate 331' of the lamp seat holder 33. The hollow insulation seat 42 is disposed within the top cavity 412, and has a top recess 422, and a second through hole 421 in spatial communication with the first through hole 413. The first contact member 43 can be made of a conductive and anti-abrasive material, and is received in the top recess 422. The second end 313 of the conducting wire 31 passes through the first through hole 413 and the second through hole 421 to connect electrically with the first contact member 43. When the first contact holder 41 rotates with the lamp seat assembly 3, the insulation seat 42 and the first contact member 43 are rotatable along with the first contact holder 41.

The second contact assembly 5 is adapted to be connected to a power source of the vehicle, and includes a positioning piece 51 that is fixed to a bottom face of the U-shaped fixed plate 23 of the main seat 2 and that extends downwardly and then forwardly, a resilient arm 52 having one end fixed to a front end of the positioning piece 51 and another end extending forwardly from said one end of the resilient arm 52, a second contact holder 54 connected to said another end of the resilient arm 52 and provided with a plurality of insulating pieces 53, a second contact member 55 welded to the second contact holder 54 and connected conductively to the first contact member 43, and an electrical wire 56 for connecting electrically the second contact member 55 to the power source of the vehicle.

The resilient arm 52 presses the second contact member 55 against the first contact member 43 so as to maintain electrical connection between the first and second contact members 43, 55.

The second contact holder 54 includes a screw part 541, and a nut 542 engaged threadedly to a top end portion of the screw part 541. The resilient arm 52 and the insulating pieces 53 are sleeved on the screw part 541.

The electrical wire 56 is fastened to the screw part 541 between the nut 542 and the insulating pieces 53 to form an electrical connection with the second contact member 55.

The driving unit 6 is fixed to the main seat 2 for driving the lamp seat assembly 3 to rotate, and includes a motor 61 fixed within the connecting rods 22 of the main seat 2 and having a first gear 611, a second gear 62 meshing with the first gear 611 and the gear of the bottom horizontal plate 331', a solenoid 63 fixed within the U-shaped fixed plate 23 of the main seat 2 to prevent undesired pivoting movement of the lamp seat assembly 3, and a sensor unit 64 to detect an angular movement of the lamp seat assembly 3.

The motor 61 has a rotary shaft extending downwardly to provide journaling of the first gear 611. The second gear 62 is mounted on the bottom plate 21' of the main seat 2. Thus, when the motor 61 is actuated, the lamp seat assembly 3 is rotated through such gear interconnections so that the direction of light projected from the lamp seat 32 can be altered.

When the rotatable lamp unit is not activated, a plunger 631 of the solenoid 63 is biased outwardly, and, through an engaging piece 632 connected to a front end of the plunger 631, engages an engaging groove (not shown) formed in an edge of the top horizontal plate 331 so that undesired pivoting movement of the lamp seat assembly 3 is prevented.

The sensor unit 64 has a movable member 641 fixed to a bottom face of the top horizontal plate 331, and a sensor member 642 fixed to a bottom portion of the movable member 641 to detect angular movement of the same.

Since the motor 61, the first and second gears 611, 62, the solenoid 63, the sensor unit 64, and the other related circuit control elements of the driving unit 6 that control pivoting movement of the lamp seat assembly 3 are conventionally applied to rotatable lamp units, and are not pertinent to the present invention, a detailed description of how the driving unit 6 drives the lamp seat assembly 3 to pivot will be dispensed herewith for the sake of brevity.

Through assembly of the aforementioned elements, the power source of the vehicle supplies electric power to the lamp seat 32 through the second contact holder 54, the second contact member 55, the first contact member 43, and the conducting wire 31, so that the light emitting member in the lamp seat 32 can generate light.

When a driver operates a steering wheel of the vehicle, the driving unit 6 drives the lamp seat assembly 3 to pivot so as to change the direction of light projected from the lamp seat 32. During rotation of the lamp seat 32, the first contact assembly 4 follows the rotation of the lamp seat holder 33, and rotates relative to the second contact assembly 5, that is, the first contact member 43 rotates relative to the second contact member 55. The second contact member 55 presses against the first contact member 43 at this time so that the first contact member 43 can maintain electrical contact with the second contact member 55 for the duration of the rotation. Hence, the conducting wire 31, which has two ends connected electrically and respectively to the lamp seat 32 and the first contact member 43, is disposed in a fixed and non-movable manner so that it is not likely to entangle even if the degree of rotation of the lamp seat 32 is significant.

From the aforementioned description of the preferred embodiment, it is apparent that the conducting wire 31 is unaffected by rotation of the lamp seat assembly 3 so that it is not likely to entangle and break, thereby resolving the problem encountered in the aforementioned conventional rotatable lamp unit.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A vehicular rotatable lamp unit comprising:
   a main seat adapted to be mounted on a vehicle;
   a lamp seat assembly connected pivotally to said main seat;
   a conducting wire having a first end connected electrically to said lamp seat assembly, and a second end opposite to said first end;
   a first contact assembly mounted on said main seat, and including a first contact member connected electrically to said second end of said conducting wire and movable along with said lamp seat assembly to rotate relative to said main seat;
   a second contact assembly adapted to be connected to a power source of the vehicle, and including a second contact member contacting directly said first contact member, said second contact member being mounted on said main seat and being nonrotatable relative to said main seat; and
   an electrical wire connected to said second contact member and adapted to be connected to the power source of the vehicle;
   wherein said first contact member is rotatable relative to said second contact member; and
   wherein said second contact assembly further includes a resilient arm having one end mounted on said main seat and another end connected to said second contact member to press said second contact member against said first contact member so as to maintain electrical connection between said first and second contact members, said second contact member being nonrotatable relative to said resilient arm.

2. The vehicular rotatable lamp unit as claimed in claim 1, wherein said second contact assembly further includes a second contact holder connected to said another end of said resilient arm, said second contact member being welded to said second contact holder.

3. The vehicular rotatable lamp unit as claimed in claim 2, wherein said electrical wire is fastened to said second contact holder to form an electrical connection with said second contact member.

4. The vehicular rotatable lamp unit as claimed in claim 1, wherein said main seat includes top and bottom plates, said lamp seat assembly including a lamp seat holder having top and bottom horizontal plates pivoted respectively to said top and bottom plates of said main seat, and two curved plates interconnecting said top and bottom horizontal plates of said lamp seat holder.

5. The vehicular rotatable lamp unit as claimed in claim 4, wherein said first contact assembly further includes a first contact holder connected to said lamp seat holder and having a top cavity, and a hollow insulation seat disposed within said top cavity, said first contact holder having a bottom flange fixed to said bottom horizontal plate of said lamp seat holder, said insulation seat having a top recess, said first contact member being received in said top recess.

* * * * *